United States Patent
Lee et al.

(10) Patent No.: US 12,110,916 B2
(45) Date of Patent: Oct. 8, 2024

(54) ENGAGEMENT VERIFYING FASTENER

(71) Applicant: Illinois Tool Works Inc., Glenview, IL (US)

(72) Inventors: Joel Robert Lee, Peotone, IL (US); Eric David Kendall, Rochester Hills, MI (US)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 17/245,096

(22) Filed: Apr. 30, 2021

(65) Prior Publication Data

US 2021/0341002 A1   Nov. 4, 2021

Related U.S. Application Data

(60) Provisional application No. 63/019,520, filed on May 4, 2020.

(51) Int. Cl.
 *F16B 21/08* (2006.01)
(52) U.S. Cl.
 CPC ........ *F16B 21/086* (2013.01); *F16B 2200/95* (2023.08); *F16B 2200/99* (2023.08)
(58) Field of Classification Search
 CPC ............ F16B 1/0071; F16B 2001/0092; F16B 21/065; F16B 21/086; F16B 2200/95; F16B 2200/99; F16B 19/1081; F16L 2201/10
 See application file for complete search history.

(56) References Cited

U.S. PATENT DOCUMENTS

| | | | |
|---|---|---|---|
| 6,209,906 B1 * | 4/2001 | DeWitt | B60H 1/34 280/732 |
| 6,511,108 B1 * | 1/2003 | Roessner, III | B65D 55/06 292/318 |
| 7,222,875 B2 * | 5/2007 | Meyendorff | B60R 21/20 280/730.2 |
| 7,677,598 B1 | 3/2010 | Ryan et al. | |
| 8,387,875 B2 * | 3/2013 | Truesdale | G07F 7/06 235/383 |
| 9,062,696 B2 * | 6/2015 | Demerath | B60R 21/217 |
| 9,127,797 B2 * | 9/2015 | Nezu | F16L 37/0841 |
| 9,267,525 B2 * | 2/2016 | Everard | F16B 21/02 |
| 9,765,923 B2 * | 9/2017 | Skull | H05K 5/0017 |
| 9,970,573 B2 * | 5/2018 | Beyer | F16L 3/233 |
| 10,253,914 B2 * | 4/2019 | Geftos | B60R 16/08 |
| 10,315,549 B2 * | 6/2019 | Fiedler | F16B 1/0071 |

(Continued)

FOREIGN PATENT DOCUMENTS

| | | | |
|---|---|---|---|
| DE | 102018219440 A1 * | 5/2020 | F16L 37/0841 |
| EP | 0691230 A1 | 1/1996 | |

(Continued)

OTHER PUBLICATIONS

Office Action for counterpart German patent application No. 10 2021 111 419.5, dated Jul. 27, 2022 (8 pages).

*Primary Examiner* — Matthew R McMahon
(74) *Attorney, Agent, or Firm* — Quarles & Brady LLP (57) ABSTRACT

A cover includes a housing and a slider. The housing defines a first window. The slider is moveably connected to the housing and defines a second window. The first window and the second window are aligned when the slider is in a first position relative to the housing and misaligned when the slider is in a second position relative to the housing.

20 Claims, 6 Drawing Sheets

(56) References Cited

U.S. PATENT DOCUMENTS

| | | | |
|---|---|---|---|
| 10,787,143 B2 * | 9/2020 | Vo | G06K 19/06037 |
| 11,143,360 B2 * | 10/2021 | Brownstone | F16B 21/065 |
| 11,466,723 B2 * | 10/2022 | Boleis | F16B 39/16 |
| 11,692,649 B2 * | 7/2023 | Locatelli | F16B 2/08 |
| | | | 248/74.1 |
| 11,698,156 B2 * | 7/2023 | Kuhn | G06K 19/07758 |
| | | | 285/84 |
| 2007/0145140 A1 | 6/2007 | Yoshimura et al. | |
| 2014/0056663 A1 * | 2/2014 | Fukumoto | F16B 19/002 |
| | | | 411/22 |
| 2019/0003626 A1 * | 1/2019 | Stieler | F16L 37/0841 |
| 2019/0331150 A1 * | 10/2019 | Shinba | B23P 19/06 |
| 2020/0309298 A1 * | 10/2020 | Kuhn | F16L 37/084 |
| 2022/0243850 A1 * | 8/2022 | Teasley | F16L 37/1225 |
| 2023/0042533 A1 * | 2/2023 | Locatelli | F16B 2/08 |

FOREIGN PATENT DOCUMENTS

| | | | | |
|---|---|---|---|---|
| ES | 2823374 B2 * | 5/2022 | | F16B 21/186 |
| FR | 2902845 A1 * | 12/2007 | | F16B 2/20 |
| WO | WO-2012144113 A1 * | 10/2012 | | F16B 19/1081 |

\* cited by examiner

ENGAGEMENT VERIFYING FASTENER

RELATED APPLICATION

This application claims the benefit of, and priority from, U.S. Provisional Application No. 63/019,520 filed May 4, 2020, which is hereby incorporated by reference in its entirety.

FIELD OF THE DISCLOSURE

Embodiments of the present disclosure generally relate to automotive components, and, more particularly, to an engagement verifying fastener.

BACKGROUND

In recent years, fasteners have been developed to secure and route fluid lines and electrical wiring. For example, vehicles include brake lines and fuel lines attached to body panels via fasteners. As another example, vehicles include wiring harnesses attached to body panels via fasteners. These fasteners firmly secure the fluid lines and the electrical lines to body panels and work to reduce movement of the fluid lines and the electrical lines relative to the body panels.

Certain known fasteners use one or more screws to tightly secure a line-routing clip to a body panel. To verify that the screw is properly torqued to the body panel, specialized measurement tools are used. Further, installation of the known fasteners requires operators to use two hands.

Therefore, a need exists for a fastener that verifies correct installation, and reduces installation complexity.

SUMMARY

In one aspect, an example cover includes a housing and a slider. The housing defines a first window. The slider is moveably connected to the housing and defines a second window. The first window and the second window are aligned when the slider is in a first position relative to the housing and misaligned when the slider is in a second position relative to the housing.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide a fastener system that verifies correct installation and reduces installation complexity when securing a fluid line and/or electrical wiring to a vehicle body panel. The example fastener system includes a cover connected to a fastener. The cover has a moveable slider that selectively obscures and reveals indicia shown on the fastener.

Figure 1:
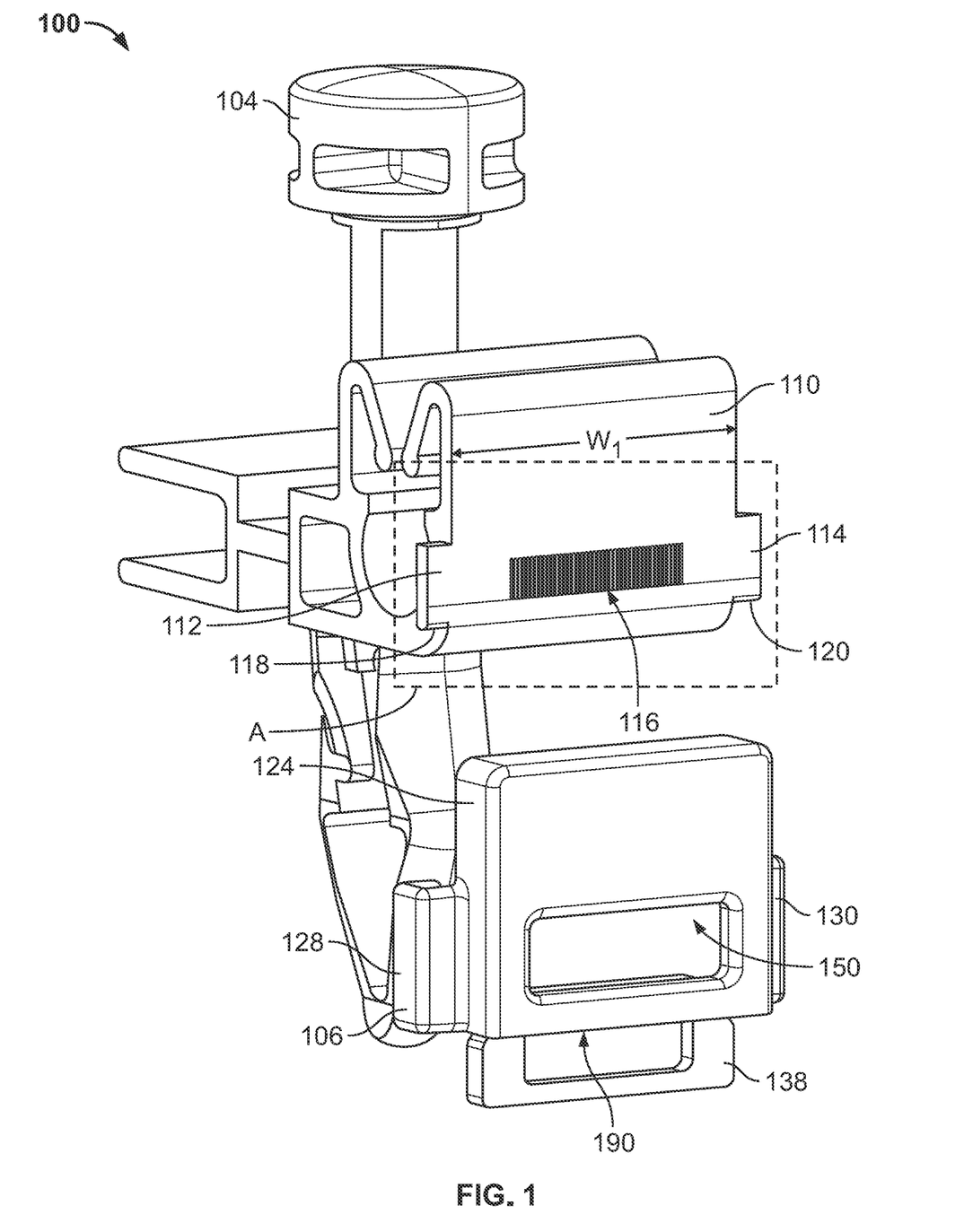
FIG. 1 is an exploded view of a first example fastener system according to an embodiment of the present disclosure.
Figure 5:
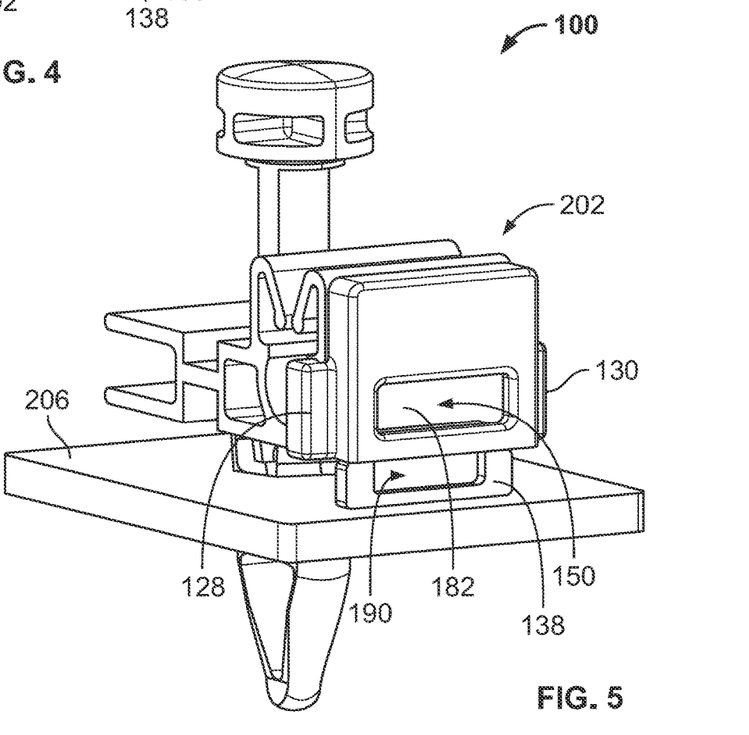
FIG. 5 is an isometric view of the first example fastener system of FIG. 1 before installation into a body panel.
Figure 6:
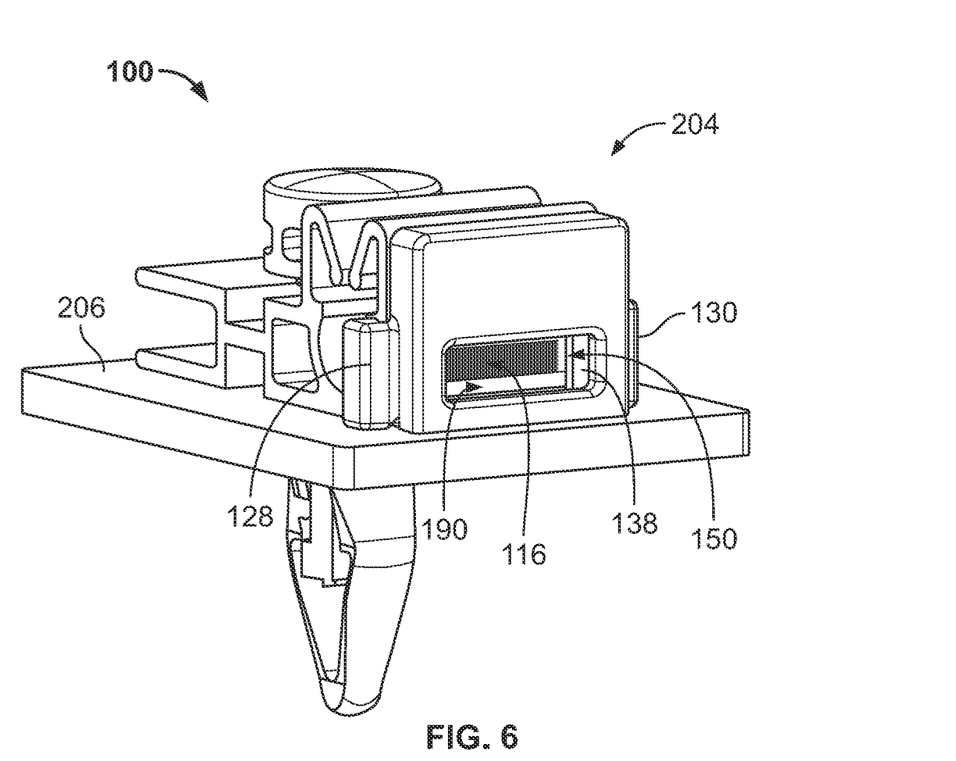
FIG. 6 is an isometric view of the first example fastener system of FIG. 1 after installation into the body panel of FIG. 5.
Figure 7:
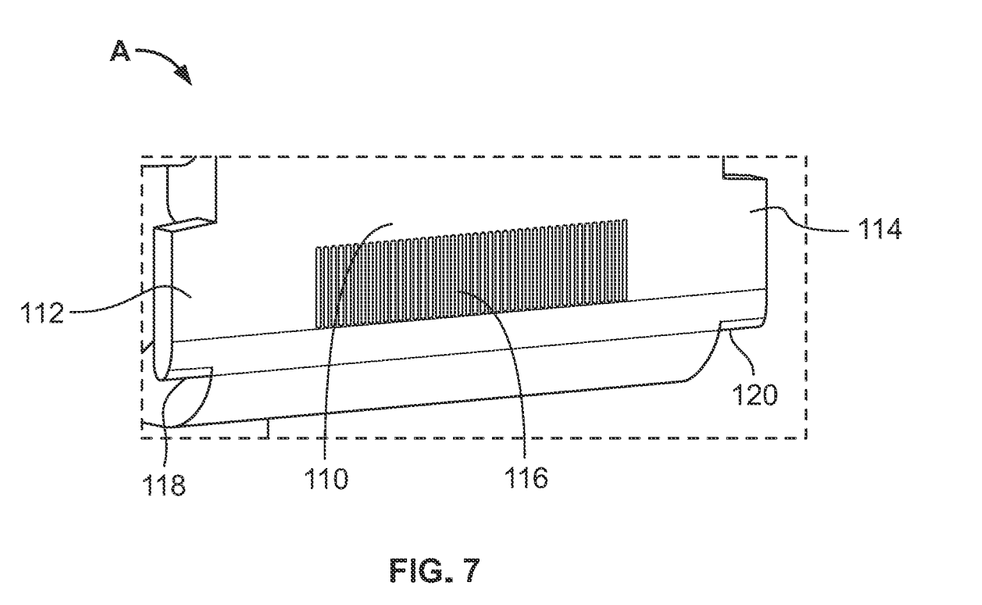
FIG. 7 is an enlarged view of a fastener of the first example fastener system of FIGS. 1, 5, and 6 taken from section A of FIG. 1.

A first example fastener system 100 according to an embodiment of the present disclosure is depicted in FIGS. 1, 5, and 6. The fastener system 100 includes a fastener 104 and a cover 106.

With reference to FIG. 1, the fastener 104 includes a mating wall 110, a first tab 112, a second tab 114, and indicia 116. The first tab 112 and the second tab 114 extend laterally from the mating wall 110. In the example of FIG. 1, the indicia 116 are printed on the mating wall 110. In some embodiments, the indicia 116 are printed on a sticker (not shown) that is affixed to the mating wall 110. In other embodiments, the indicia 116 are included in the cover 106 and are printed on the cover 106 and/or on a sticker affixed to the cover 106 (not shown). The indicia 116 may be any type of mark or indicator (e.g., a barcode, "OK," "not OK," one or more color-coded paint dots, etc.). In some embodiments, the indicia 116 indicate and/or are encoded to describe the type of line routed by the fastener system 100 (e.g., a brake line, a fuel line, rear light wiring, etc.) and/or any other suitable information about the fastener or the system in which it is installed. In some embodiments, the indicia 116 may be scanned for entry into a database (e.g., an electronic error-proofing database). The first tab 112 has a first lead in 118 (e.g., a chamfer and/or a radius). The second tab 114 has a second lead in 120.

Figure 4:
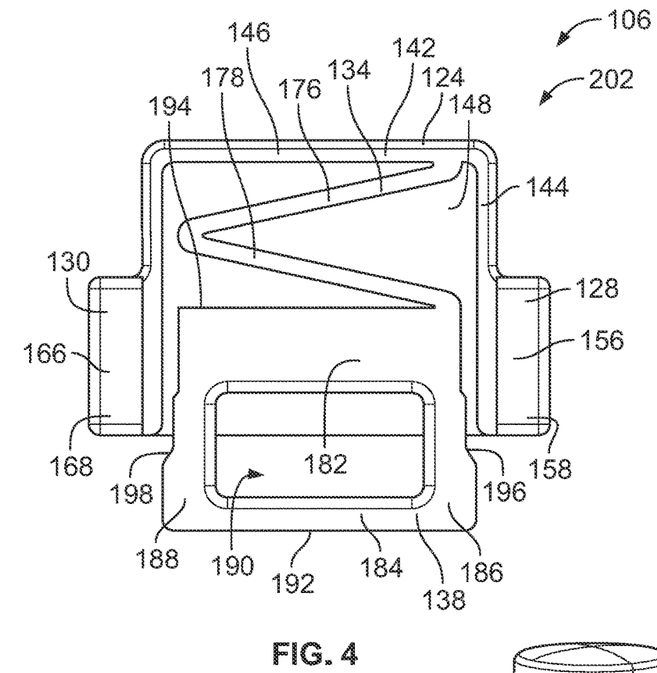
FIG. 4 is a rear view of the first example cover of FIGS. 2 and 3.

With reference to FIG. 4, the cover 106 has a housing 124, a first bracket 128, a second bracket 130, a spring 134, and a slider 138. The first bracket 128 and the second bracket 130 extend laterally from the housing 124. The spring 134 is connected to the housing 124 and the slider 138. The spring 134 is disposed in the housing 124. The slider 138 is at least partially disposed in the housing 124.

Figure 2:
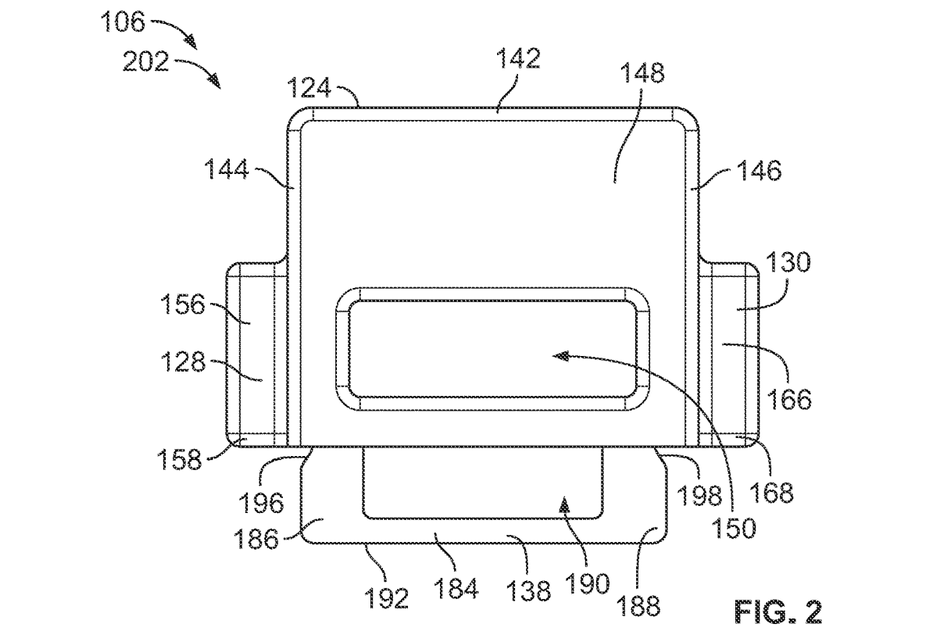
FIG. 2 is a front view of a first example cover of the first fastener system of FIG. 1.

With continued reference to FIG. 4, the housing 124 has a top wall 142, a first side wall 144, a second side wall 146, and a front wall 148. The front wall 148 is connected to the top wall 142, the first side wall 144, and the second side wall 146. The top wall 142 is connected to the first side wall 144 and the second side wall 146. With reference to FIG. 2, the front wall 148 defines a first window 150.

Figure 3:
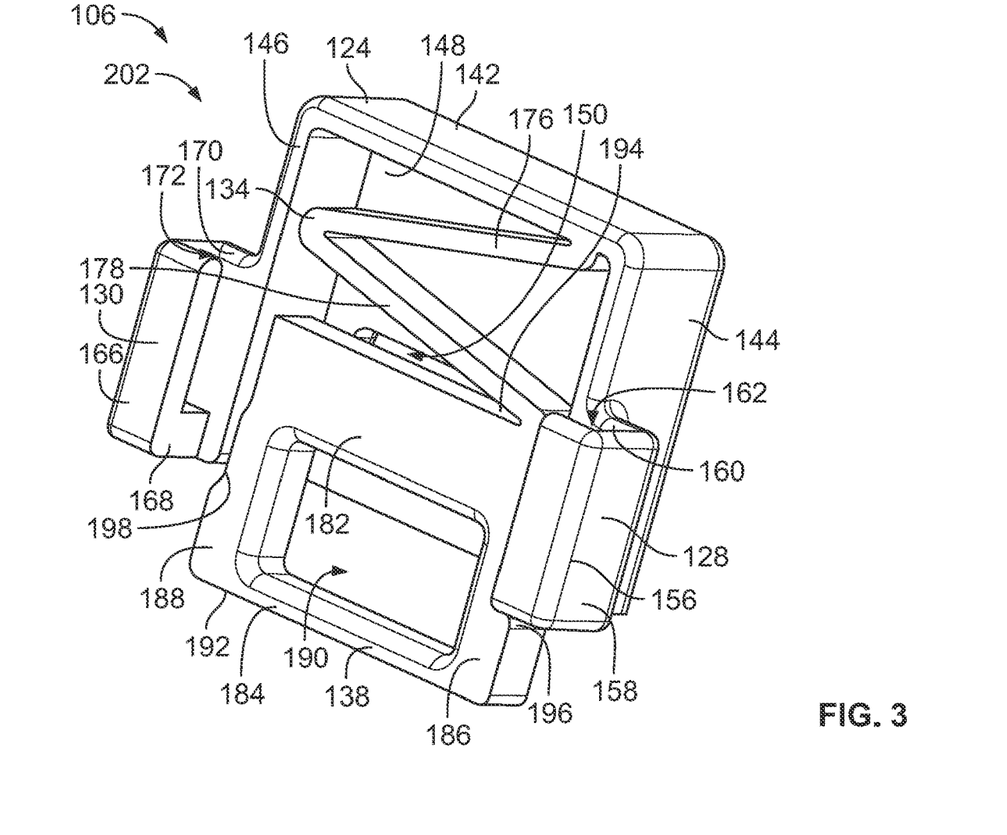
FIG. 3 is an isometric view of the first example cover of FIG. 2.

With reference to FIG. 3, the first bracket 128 has a first clasp 156, a first end wall 158, and a first snap barb 160. The first end wall 158 is connected to the first clasp 156. The first bracket 128 defines a first slot 162. Optionally, the first snap barb 160 may extend from the first clasp 156 into the first slot 162. The second bracket 130 is a mirror image of the first bracket 128. The second bracket 130 has a second clasp 166, a second end wall 168, and a second snap barb 170. The second end wall 168 is connected to the second clasp 166. The second bracket 130 defines a second slot 172. Optionally, the second snap barb 170 may extend from the second clasp 166 into the second slot 172.

With reference to FIG. 5, the cover 106 snapably engages the fastener 104. More specifically, the first bracket 128 slidably receives the first tab 112 (shown in FIG. 1) via the first slot 162 (shown in FIG. 3) until the first snap barb 160 (shown in FIG. 3) snaps around the first tab 112. Further, the second bracket 130 slidably receives the second tab 114 (shown in FIG. 1) via the second slot 172 (shown in FIG. 3) until the second snap barb 170 (shown in FIG. 3) snaps around the second tab 114.

With reference to FIG. 4, the spring 134 includes a first arm 176 and a second arm 178. The first arm 176 is connected to the second arm 178. In the example of FIG. 4, the spring 134 is a leaf spring. In other words, in the example of FIG. 4, the spring 134 is a resilient living hinge. It should be understood that the spring 134 may be any type of spring (e.g., helical, conical, torsion, etc.).

With reference to FIG. 4, the slider 138 has a top rail 182, a bottom rail 184, a first stile 186, and a second stile 188. The slider 138 defines a second window 190. The second window 190 and the first window 150 are generally equal in size and shape. The top rail 182 is connected to the first stile 186 and the second stile 188. The bottom rail 184 is connected to the first stile 186 and the second stile 188. In the example of FIG. 4, the top rail 182 is wider than the bottom rail 184. Thus, the second window 190 is defined closer to a bottom edge 192 than a top edge 194. The first stile 186 has a first set of lead in features 196. The second stile 188 has a second set of lead in features 198. The first set of lead in features 196 are a series of chamfers graduated relative to one another. The second set of lead in features 198 are also a series of chamfers graduated relative to one another. The slider 138 slidably engages the housing 124. The slider 138 is at least partially disposed in the housing 124. The slider 138 is moveable relative to the housing 124. The spring 134 urges the slider 138 away from the housing 124.

With reference to FIG. 5, the slider 138 is in an extended position 202 relative to the housing 124. When the slider 138 is in the extended position 202, the first window 150 and the second window 190 are misaligned and the top rail 182 overlaps the first window 150. Thus, in operation, when the slider 138 is in the extended position 202, the indicia 116 (shown in FIG. 1) are obscured. With reference to FIG. 6, the slider 138 is in a compressed position 204 relative to the housing 124. When the slider 138 is in the compressed position 204, the first window 150 and the second window 190 are aligned. The cover 106 is positioned relative to the mating wall 110, such that a portion of the mating wall 110 is visible through both the first window 150 and the second window 190 when the slider 138 is in the compressed position 204 (i.e. a first position). Additionally, the indicia 116 may be visible through both the first window 150 and the second window 190 when the slider 138 is in the compressed position 204 (i.e. the first position) and the indicia 116 is hidden when the slider 138 is in the extended position 202 (i.e. a second position). Thus, in operation, when the slider 138 is in the compressed position 204, the indicia 116 are revealed.

With reference to FIG. 5, when the fastener 104 approaches a panel 206, the slider 138, in the extended position 202, contacts the panel 206. With reference to FIG. 6, in operation, when the fastener 104 is secured to the panel 206, the slider 138 is moved into the compressed position 204 against the panel 206. It should be appreciated that the fastener 104 is configured to be secured to the panel 206 in a one-handed operation. In the example of FIG. 6, when the fastener system 100 is installed in the panel 206, the first window 150 is aligned with the second window 190 to reveal the indicia 116. Thus, the cover 106 selectively reveals the indicia 116.

Figure 8:
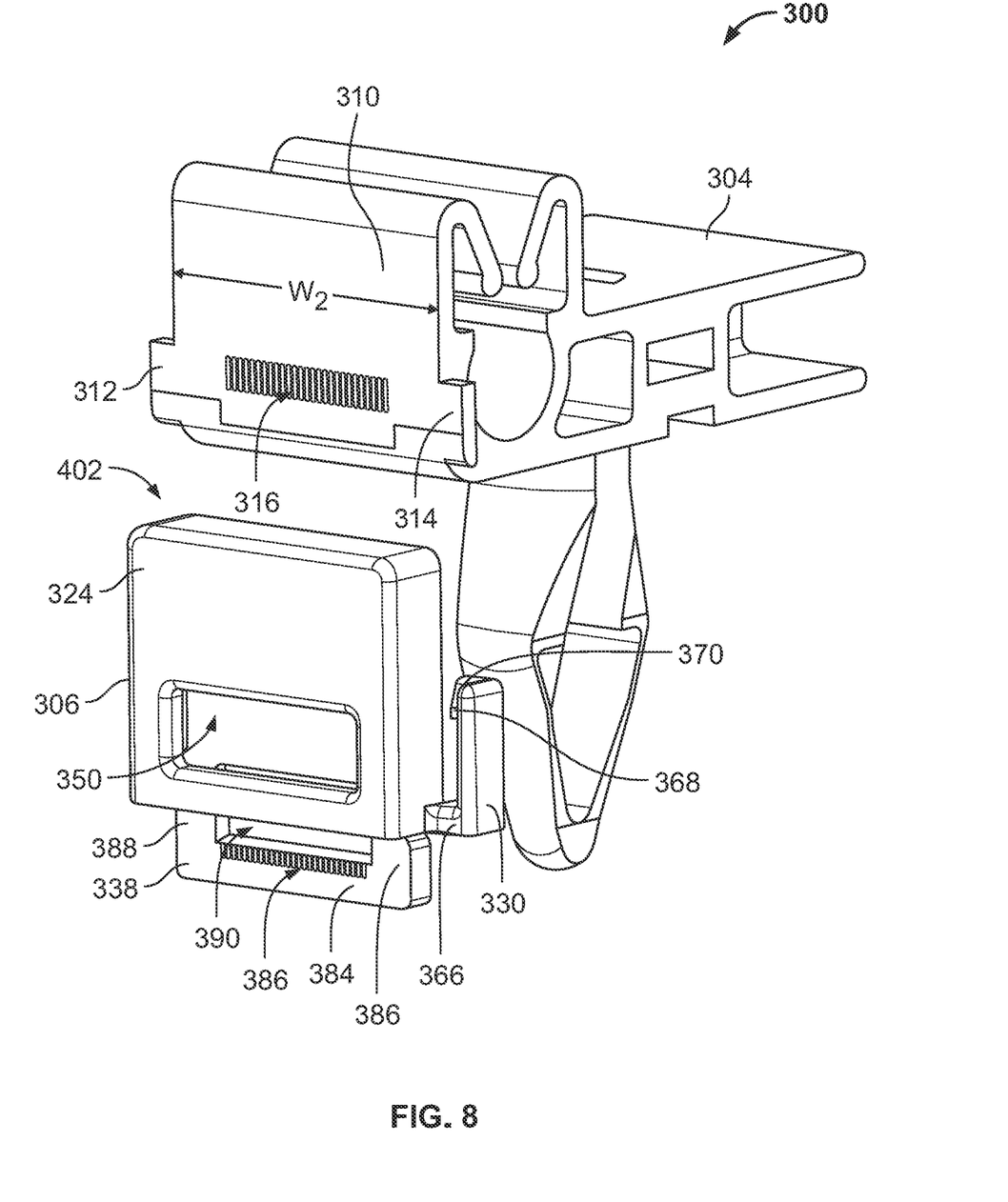
FIG. 8 is an exploded view of a second example fastener system according to an embodiment of the present disclosure.
Figure 9:
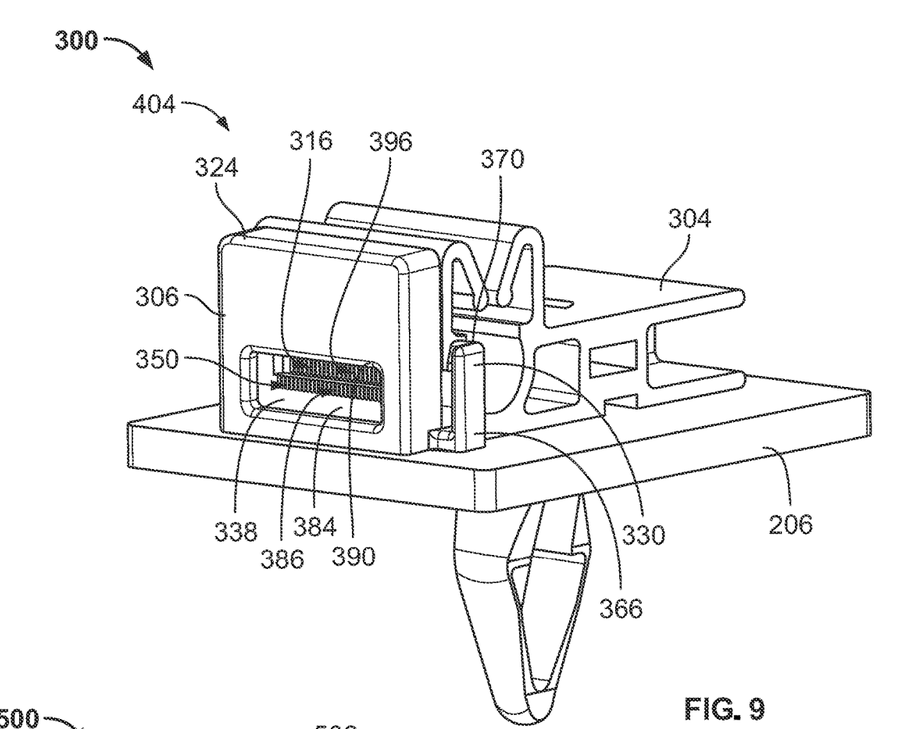
FIG. 9 is an isometric view of the second example fastener system of FIG. 8 after installation in the body panel of FIGS. 5 and 6.

A second example fastener system 300 according to an embodiment of the present disclosure is depicted in FIGS. 8 and 9. The second example fastener system 300 includes a fastener 304 and a cover 306. With reference to FIG. 8, the fastener 304 includes the mating wall 310, the first tab 312, and the second tab 314, described above. The fastener 304 further includes a first indicia portion 316. It should be appreciated that the first indicia portion 316 is narrower than the indicia 116 (shown in FIG. 1). In the example of FIG. 8, the first indicia portion 316 is printed on the mating wall 310. In some embodiments, the first indicia portion 316 is printed on a sticker (not shown) that is affixed to the mating wall 310. The first indicia portion 316 may be any type of mark or indicator (e.g., a barcode, "OK," "not OK," one or more color-coded paint dots, etc.).

With reference to FIG. 8, the cover 306 includes the housing 324 and the spring 134 (shown in FIG. 3) described above. The cover 306 further includes a first bracket (not shown), a second bracket 330, and a slider 338. The first bracket and the second bracket 330 extend laterally from the housing 324. The slider 338 is connected to the spring (not shown) in the same manner as the slider 138 is connected to the spring 134 (shown in FIG. 4). The spring is substantially similar to spring 134. The slider 338 is at least partially disposed in the housing 324. The slider 338 is moveable relative to the housing 324. The first bracket includes a first hook, a first retainer, and the first snap barb (not shown). The first hook extends from the housing 324 in the same manner as the first clasp 156 (shown in FIG. 4). The first retainer extends from the first hook toward the housing 324. The first snap barb extends from the first retainer. The second bracket 330 is a mirror image of the first bracket. The second bracket 330 includes a second hook 366, a second retainer 368, and the second snap barb 370. The second hook 366 extends from the housing 324 in the same manner as the second clasp 166 (shown in FIG. 4). The second retainer 368 extends from the second hook 366 toward the housing 324. The second snap barb 370 extends from the second retainer 368.

With reference to FIG. 8, the slider 338 includes a top rail (substantially similar to the top rail 182 shown in FIG. 4), a first stile 386, and a second stile 388, that are each substantially similar to the corresponding components described above. The slider 338 also includes a bottom rail 384 and a second indicia portion 386. The bottom rail 384 is connected to the first stile 386 and the second stile 388. In the example of FIG. 8, the second indicia portion 386 is printed along the bottom rail 384. In some embodiments, the second indicia portion 386 is printed on a sticker (not shown) that is affixed to the bottom rail 384. The second indicia portion 386 may be any type of mark (e.g., a barcode, "OK," "not OK," one or more color-coded paint dots, etc.). The slider 338 defines a second window 390. The second window 390 is smaller than the first window 350.

With reference to FIG. 8, the slider 338 is in an extended position 402 relative to the housing. When the slider 338 is in the extended position, the first window 350 and the second window 390 are misaligned and the top rail overlaps the first window 350. Thus, in operation, when the slider 338 is in the extended position 402, the first indicia portion 316 is obscured. With reference to FIG. 9, the slider 338 is in a compressed position 404 relative to the housing 324. When the slider 338 is in the compressed position 404, the first window 350 and the second window 390 are aligned and the bottom rail 384 partially overlaps the first window 350. Thus, in operation, when the slider 338 is in the compressed position 404, the first indicia portion 316 is revealed through the first window 350 and the second window 390, the second indicia portion 386 is visible through the first window 350, and the first indicia portion 316 and the second indicia portion 386 converge.

In some embodiments, the first indicia portion 316 and the second indicia portion 386 correspond to one another. For example, when combined, the first indicia portion 316 and the second indicia portion 386 may form a complete set of indicia 396. More specifically, in one implementation, the first indicia portion 316 may comprise a part or portion of a complete set of indicia 396, which may also be referred to as a third indicia portion 396. Further, the second indicia portion 316 may comprise the remainder of the part or portion of the complete set of indicia 396 or third indicia portion 396. In the present embodiment, the complete set of indicia 396 or third indicia portion 396 is defined by the alignment of the first and second indicia portions, so that a first height of the first indicia portion 316 is combined with a second height of the second indicia portion 386 to form a total height of the complete set of indicia 396. It is also contemplated that the bifurcation of the complete set of indicia or third indicia portion could be made in a lengthwise, horizontal, diagonal, or any direction. Further, it is also contemplated that the complete set of indicia 396 or third indicia portion 396 could comprise an overlay of the first and second indicia portions.

In some embodiments, the complete set of indicia 396 indicate and/or are encoded to describe the type of line routed by the fastener system 300 (e.g., a brake line, a fuel line, rear light wiring, etc.) and/or any other suitable information about the fastener or the system in which it is installed. In some embodiments, the complete set of indicia 396 may be scanned for entry into a database (e.g., an electronic error-proofing database).

With reference to FIG. 9, in operation, when the fastener 304 is secured to the panel 206, the slider 338 is moved into the compressed position 404 against the panel 206. It should be appreciated that the fastener 304 is configured to be secured to the panel 206 in a one-handed operation. In the example of FIG. 9, when the fastener system 300 is installed in the panel 206, the first window 350 is aligned with the second window 390 to reveal the first indicia portion 316 and combine the first indicia portion 316 and the second indicia portion 386. Thus, the cover 306 selectively aligns the first indicia portion 316 and the second indicia portion 386.

Figure 10:
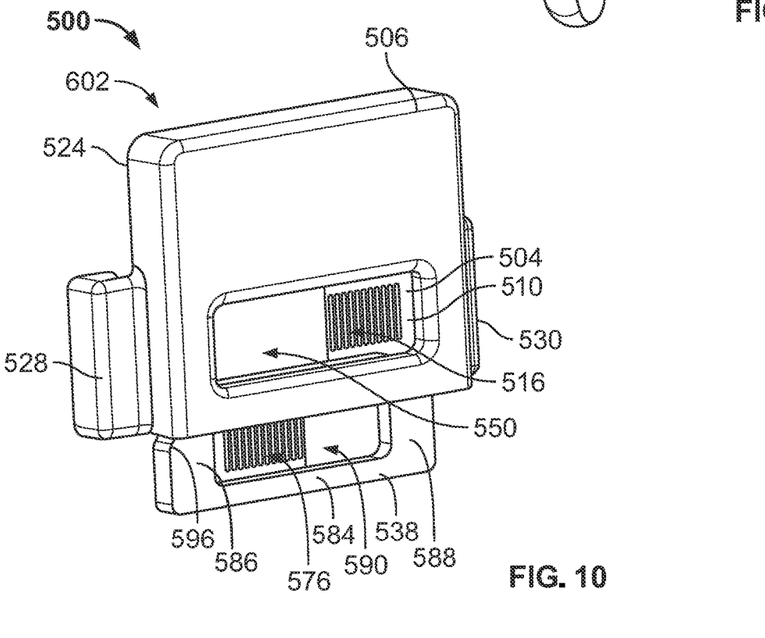
FIG. 10 is a partial isometric view of a third example fastener system.

A third example fastener system 500 according to an embodiment of the present disclosure is depicted in FIG. 10. The third example fastener system 500 includes a fastener 504 and a cover 506. The fastener 504 includes a mating wall 510, a first tab (substantially similar to the first tab 112 shown in FIG. 1), and a second tab (substantially similar to the second tab 114 shown in FIG. 1). The fastener 504 also includes a first indicia portion 516. In the example of FIG. 10, the first indicia portion 516 is printed on the mating wall 510. In some embodiments, the first indicia portion 516 is printed on a sticker (not shown) that is affixed to the mating wall 510. The first indicia portion 516 may be any type of mark (e.g., a barcode, "OK," "not OK," one or more color-coded paint dots, etc.).

With reference to FIG. 10, the cover 506 includes the housing 524, the first bracket 528, the second bracket 530, and the spring (substantially similar to the spring 134 shown in FIG. 3). The cover 506 also includes a slider 538. The slider 538 is connected to the spring in the same manner as the slider 138 is connected to the spring 134, described above. The slider 538 is at least partially disposed in the housing 524. The slider 538 is moveable relative to the housing 524.

With reference to FIG. 10, the slider 538 includes the top rail (substantially similar to the top rail 182 shown in FIG. 4), the bottom rail 584, and the second stile 188 described above. The slider 538 also includes a second indicia portion 576 and a first stile 586. The slider 538 defines a second window 590. The first window 550 and the second window 590 are generally perpendicular to one another. The first stile 586 includes the first set of lead in features 596. The first stile 586 is wider than the second stile 588. Thus, the second window 590 is laterally offset in the slider 538. In the example of FIG. 10, the second indicia portion 576 is printed on the slider 538. In some embodiments, the second indicia portion 576 is printed on a sticker (not shown) that is affixed to the first stile 586. The second indicia portion 576 may be any type of mark (e.g., a barcode, "OK," "not OK," one or more color-coded paint dots, etc.).

With reference to FIG. 10, the slider 538 is in an extended position 602 relative to the housing 524. When the slider 538 is in the extended position 602, the top rail overlaps the first window 550. Thus, in operation, when the slider 538 is in the extended position 602, the first indicia portion 516 and the second indicia portion 576 are misaligned. When the slider 538 is in a compressed position relative to the housing 524 (not shown), the first stile 586 overlaps the first window 550. Thus, in operation, when the slider 538 is in the compressed position, the first indicia portion 516 is visible through the first window 550 and the second window 590, the second indicia portion 576 is visible through the first window 550, and the first indicia portion 516 and the second indicia portion 576 converge. In some embodiments, the first indicia portion 516 and the second indicia portion 576 correspond to one another. For example, when combined, the first indicia portion 516 and the second indicia portion 576 may form a complete set of indicia (not shown). More specifically, the first indicia portion 516 may comprise a part or portion of the length of the complete set of indicia (which may also be referred to as a third indicia portion). Further, the second indicia portion 576 may comprise a part or potion of the length of the complete set of indicia or the third indicia portion. In the present embodiment, the complete set of indicia or third indicia portion is defined by the alignment of the first and second indicia portions, so that a first length of the first indicia portion 516 is combined with a second length of the second indicia portion 576 to form a total length of the complete set of indicia. It is also contemplated that the complete set of indicia or third indicia portion could comprise an overlay of the first and second indicia portions. In some embodiments, the complete set of indicia indicate and/or are encoded to describe the type of line routed by the fastener system 500 (e.g., a brake line, a fuel line, rear light wiring, etc.) and/or any other suitable information about the fastener or the system in which it is installed. In some embodiments, the complete set of indicia may be scanned for entry into a database (e.g., an electronic error-proofing database). Thus, the cover 506 selectively aligns the first indicia portion 516 and the second indicia portion 576.

As used herein, panel may refer to any component that may be attached or assembled to another component. Any of the panels described herein may be made of any suitable material, for example, a metal or plastic material.

Embodiments of the present disclosure provide a fastener system, and, more particularly, a fastener connected to a cover that is configured to selectively obscure and reveal indicia shown on the fastener. In some embodiments, the cover includes a housing and a spring loaded slider, which selectively align and misalign windows defined in the housing and in the slider.

From the foregoing, it will be appreciated that the above example fastener systems 100, 300, 500 selectively reveal and obscure indicia when secured to a panel. Thus, the fastener systems 100, 300, 500 provide a way to visually verify that fastener system is securely mounted to the panel. Further, the fastener systems 100, 300, 500 obviate the need for screws to secure fluid lines and/or electrical lines to body panels. Thus, as compared to existing fasteners, the fastener systems 100, 300, 500 improve the efficiency of installing fluid lines and/or electrical lines, reduces weight, reduces part complexity, obviates cross threaded screws, reduces misassembly and associated waste, and obviates specialized torque tools to verify installation. Thus, the above-disclosed fastener systems 100, 300, 500 conserve resources and energy as compared to existing fasteners.

While the fastener verification assemblies and methods described herein are shown with regard to a particular fastener, such fastener verification assemblies and methods may be utilized with any fastener, of any size, with any one or more features or functions. It is contemplated that the fastener verification assemblies may be standardized for use with multiple different fasteners of a specific size, for example, by utilizing a particular size of fastener verification assembly for all fasteners having a particular width $W_1$ and utilizing a different size of fastener verification assembly for all fasteners having a different particular width $W_2$.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A cover, comprising:
   a housing that includes a first window and a front wall that is defined between a top wall, a first side wall, and a second side wall; and
   a slider that includes a second window defined by a top rail, a bottom rail, a first stile, and a second stile and is moveably connected to the top wall of the housing by a living hinge that extends from the top rail of the slider,
   wherein the first window and the second window are aligned when the slider is in a first position relative to the housing, and
   misaligned when the slider is in a second position relative to the housing.

2. The cover of claim 1, wherein the living hinge is a spring that is at least partially disposed in the housing and is connected to both the housing and the slider.

3. The cover of claim 2, wherein the slider is in the first position (Original) relative to the housing when the spring is in a compressed state and in the second position relative to the housing when the spring is in an extended state.

4. The cover of claim 3, wherein the cover is positioned on a mating wall, and
   wherein a portion of the mating wall is visible through both the first window and the second window when the slider is in the first position.

5. The cover of claim 4, wherein an indicia is disposed on the mating wall, and
   wherein the indicia is visible through both the first window and the second window when the slider is in the first position and the indicia is hidden when the slider is in the second position.

6. The cover of claim 4, wherein a first indicia portion is disposed on the mating wall and a second indicia portion is disposed on the slider, and
   wherein the first indicia portion is visible through both the first window and the second window when the slider is in the first position and the first indicia portion is hidden when the slider is in the second position,
   wherein the second indicia portion is visible through the first window when the slider is in the first position, and
   wherein when the slider is in the first position the first indicia portion and the second indicia portion converge and form a complete set of indicia.

7. The cover of claim 6, wherein the first indicia portion comprises part of the height of the complete set of indicia, the second indicia portion comprises part of the height of the complete set of indicia, and the total height of the complete set of indicia is defined by the combined heights of the first indicia portion and the second indicia portion.

8. The cover of claim 6, wherein the first indicia portion comprises part of the length of the complete set of indicia, the second indicia portion comprises part of the length of the complete set of indicia, and the total length of the complete set of indicia is defined by the combined lengths of the first indicia portion and the second indicia portion.

9. The cover of claim 6, wherein the complete set of indicia is configured to be scanned for entry into a database.

10. A fastener system, comprising:
a fastener; and
a cover comprising:
  a housing that includes a first window and a front wall that is defined between a top wall, a first side wall, and a second side wall; and
  a slider that includes a second window defined by a top rail, a bottom rail, a first stile, and a second stile and is moveably connected to the top wall of the housing by a living hinge that extends from the top rail of the slider,
wherein the first window and the second window are aligned when the slider is in a first position relative to the housing, and
  misaligned when the slider is in a second position relative to the housing, wherein the cover is configured to couple with the fastener,
wherein the living hinge is a spring including a first arm and a second arm that are partially disposed in the housing, and
wherein an end of the first arm is only connected to the housing and an end of the second arm is only connected to the slider.

11. The fastener system of claim 10, wherein the cover is configured to snapably engage with the fastener.

12. The fastener system of claim 11, wherein the fastener further comprises a mating wall having a first tab and a second tab that extend laterally outward from the mating wall.

13. The fastener system of claim 12, wherein the housing further comprises a first bracket and a second bracket, and
wherein the first bracket and the second bracket are configured to couple with the first tab and the second tab.

14. The fastener system of claim 13, wherein the first bracket comprises:
a first clasp;
a first end wall that is connected to the first clasp;
a first slot that is defined by the first clasp and the first end wall; and
a first snap barb that extends from the first clasp into the first slot,
wherein the second bracket comprises:
a second clasp;
a second end wall that is connected to the second clasp;
a second slot that is defined by the second clasp and the second end wall;
and
a second snap barb that extends from the second clasp into the second slot,
and
wherein the first and second brackets slidably receive the first and second tabs via the first and second slots respectively.

15. The fastener system of claim 13, wherein the first bracket comprises:
a first hook extending from the housing;
a first retainer extending from the first hook toward the housing; and
a first snap barb extending from the first retainer,
wherein the second bracket comprises:
a second hook extending from the housing;
a second retainer extending from the second hook toward the housing; and
a second snap barb extending from the second retainer, and
wherein the first and second brackets slidably receive the first and second tabs.

16. A fastener system, comprising:
a fastener comprising:
  a mating wall with a first tab and a second tab that extend laterally outward from the mating wall;
  indicia; and
a cover comprising:
  a housing that includes a first window and a front wall that is defined between a top wall, a first side wall, and a second side wall;
  a first bracket and a second bracket that are configured to couple with the first and second tabs, respectively; and
  a slider that includes a second window defined by a top rail, a bottom rail, a first stile, and a second stile and is moveably connected to the top wall of the housing by
  a spring that is at least partially disposed in the housing and is integrally connected to both the top wall of the housing and the top rail of the slider,
wherein the first window and the second window are aligned when the slider is in a first position relative to the housing, and misaligned when the slider is in a second position relative to the housing,
wherein the slider is in the first position relative to the housing when the spring is in a compressed state and in the second position relative to the housing when the spring is in an extended state,
wherein a portion of the mating wall is visible through both the first window and the second window when the slider is in the first position,
wherein at least a portion of the indicia is visible through both the first window and the second window when the slider is in the first position and is hidden when the slider is in the second position, and
wherein the cover is configured to snapably engage with the fastener.

17. The fastener system of claim 16, wherein the entire indicia is visible through both the first window and the second window when the slider is in the first position and the entire indicia is hidden when the slider is in the second position.

18. The fastener system of claim 16, wherein the indicia comprises a first indicia portion that is disposed on the mating wall and a second indicia portion that is disposed on the slider,
wherein the first indicia portion is visible through both the first window and the second window when the slider is in the first position and the first indicia portion is hidden when the slider is in the second position,
wherein the second indicia portion is visible through the first window when the slider is in the first position, and
wherein when the slider is in the first position the first indicia portion and the second indicia portion converge and form a complete set of indicia.

19. The fastener system of claim 18, wherein the first indicia portion comprises part of the height of the complete set of indicia, the second indicia portion comprises part of the height of the complete set of indicia, and the total height of the complete set of indicia is defined by the combined heights of the first indicia portion and the second indicia portion.

20. The fastener system of claim 18, wherein the first indicia portion comprises part of the length of the complete set of indicia, the second indicia portion comprises part of the length of the complete set of indicia, and the total length of the complete set of indicia is defined by the combined lengths of the first indicia portion and the second indicia portion.

* * * * *